(12) United States Patent
Zhang

(10) Patent No.: US 10,316,723 B2
(45) Date of Patent: Jun. 11, 2019

(54) EXHAUST GAS MIXER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 15/247,683

(22) Filed: Aug. 25, 2016

(65) Prior Publication Data
US 2018/0058294 A1 Mar. 1, 2018

(51) Int. Cl.
| F01N 3/28 | (2006.01) |
| F01N 13/08 | (2010.01) |
| B01F 5/06 | (2006.01) |
| F01N 3/20 | (2006.01) |

(52) U.S. Cl.
CPC .......... *F01N 3/2892* (2013.01); *B01F 5/0616* (2013.01); *F01N 3/2066* (2013.01); *F01N 13/08* (2013.01); *B01F 2005/0639* (2013.01); *F01N 2470/00* (2013.01); *F01N 2610/00* (2013.01); *F01N 2610/02* (2013.01); *Y02T 10/24* (2013.01)

(58) Field of Classification Search
CPC .... F01N 3/2892; F01N 13/08; F01N 2470/00; F01N 2610/00
USPC .......................................................... 60/319
See application file for complete search history.

(56) References Cited

U.S. PATENT DOCUMENTS

| | | | |
|---|---|---|---|
| 3,923,288 A | 12/1975 | King | |
| 8,141,353 B2 | 3/2012 | Zheng et al. | |
| 8,745,978 B2 | 6/2014 | Vanvolsem et al. | |
| 2012/0204541 A1 | 8/2012 | Li et al. | |
| 2013/0104531 A1 | 5/2013 | Cho et al. | |
| 2013/0188444 A1* | 7/2013 | Palmer | B01F 5/0473 366/337 |
| 2015/0016214 A1* | 1/2015 | Mueller | B01F 5/0616 366/337 |
| 2017/0022869 A1* | 1/2017 | Ly | B01F 5/0268 |

* cited by examiner

*Primary Examiner* — Laert Dounis
*Assistant Examiner* — Kelsey L Stanek
(74) *Attorney, Agent, or Firm* — Julia Voutyras; McCoy Russell LLP

(57) ABSTRACT

Methods and systems are provided for an exhaust gas mixer. In one example, a system may include a mixer configured to alter exhaust gas flow.

19 Claims, 9 Drawing Sheets

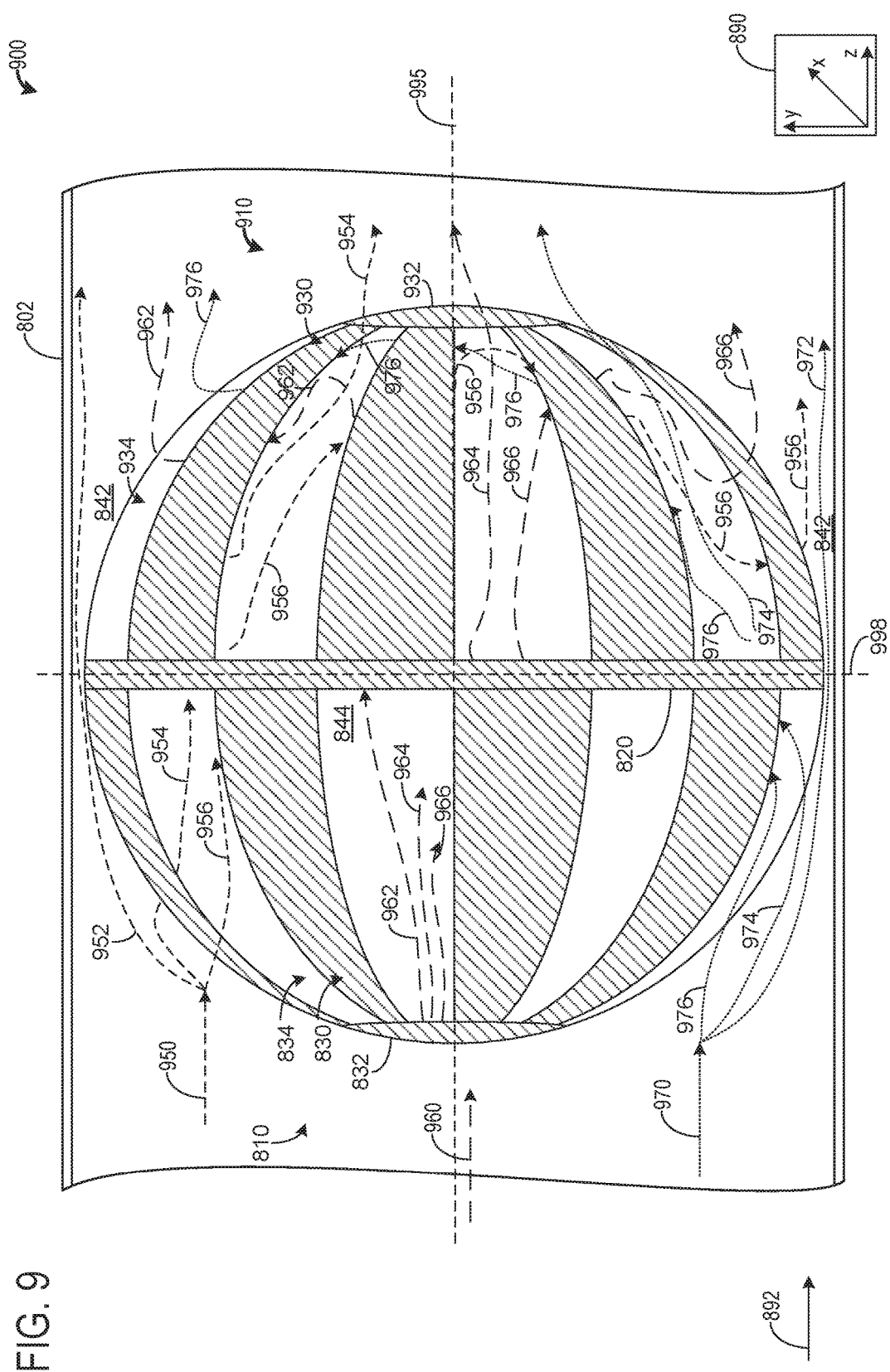

EXHAUST GAS MIXER

FIELD

The present description relates generally to systems for a mixing device.

BACKGROUND/SUMMARY

One technology for after-treatment of engine exhaust utilizes selective catalytic reduction (SCR) to enable certain chemical reactions to occur between $NO_x$ (nitrogen oxides) in the exhaust and ammonia ($NH_3$). $NH_3$ is introduced into an engine exhaust system upstream of an SCR device by injecting urea into an exhaust pathway, or is generated in an upstream catalyst. The urea entropically decomposes to $NH_3$ under high temperature conditions. The SCR facilitates the reaction between $NH_3$ and $NO_x$ to convert $NO_x$ into nitrogen ($N_2$) and water ($H_2O$). However, as recognized by the inventors herein, issues may arise upon injecting urea into the exhaust pathway. In one example, urea may poorly mix into the exhaust flow (e.g., a first portion of exhaust flow has a higher concentration of urea than a second portion of exhaust flow) which may lead to poor coating of the SCR and poor reactivity between emissions (e.g., $NO_x$) and the SCR device. Additionally, overly mixing and agitating the urea in the exhaust can likewise cause issues, such as increased deposits.

Attempts to address insufficient mixing include introducing a mixing device downstream of a urea injector and upstream of the SCR device such that urea dispersion with exhaust gas may be more homogenous. Other attempts to address urea mixing include a stationary mixing apparatus. One example approach is shown by Cho et al. in U.S. 2013/0104531. Therein, a static mixer is located in an exhaust passage downstream of an external tube for injecting urea. The exhaust gas flows through the exhaust passage and merges with a urea injection before flowing through the static mixer.

However, the inventors herein have recognized potential issues with such systems. As one example, the static mixer described above presents limited mixing capabilities due to a directionality of exhaust outflow through the mixer being unable to fully mix the urea and exhaust gas. The static mixer inside the exhaust passage also presents manufacturing and packaging constraints. Varying exhaust passage geometries demand an alteration in the manufacturing of the exhaust passage and/or static mixer for the mixer to tightly fit within the exhaust passage. Lastly, the static mixer may overly agitate the urea. Thus, deposits may form on surfaces of the mixer and/or downstream of the mixer (onto the SCR device, for example). These deposits may accumulate and hinder exhaust flow through the exhaust passage, thereby increasing an exhaust backpressure.

The inventors herein have recognized the issues with the above approach and offer a system to at least partly address them. In one example, the issues described above may be addressed by an exhaust system comprising an exhaust gas mixer, located along an exhaust passage, comprising upstream and downstream halves physically coupled to a ring, the upstream and downstream halves comprise upstream and downstream strips physically coupled to upstream and downstream flow guides and the ring at opposite ends, and where flow spaces are located between the each of the strips. In this way, exhaust gas flow may be altered to increasing exhaust gas mixing.

As one example, features of the mixer alter a trajectory of exhaust gas to redirect exhaust gas flow from a first region of an exhaust passage to a second, different region of the exhaust passage. This may allow exhaust gas in different regions of the exhaust passage to mix, thereby increasing a homogeneity of the exhaust passage. Furthermore, exhaust gas may further mix downstream of the mixer due to increased exhaust gas turbulence generated by the mixer. Exhaust gas may tumble and/or swirl downstream of the mixer, further increasing exhaust gas homogeneity. This may improve exhaust system component performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 shows a three-dimensional side-view of the third embodiment along with an example exhaust flow therethrough.

FIGS. 2-9 are shown approximately to scale, however, other relative dimensions may be used without departing from the scope of the present disclosure.

DETAILED DESCRIPTION

Figure 2:
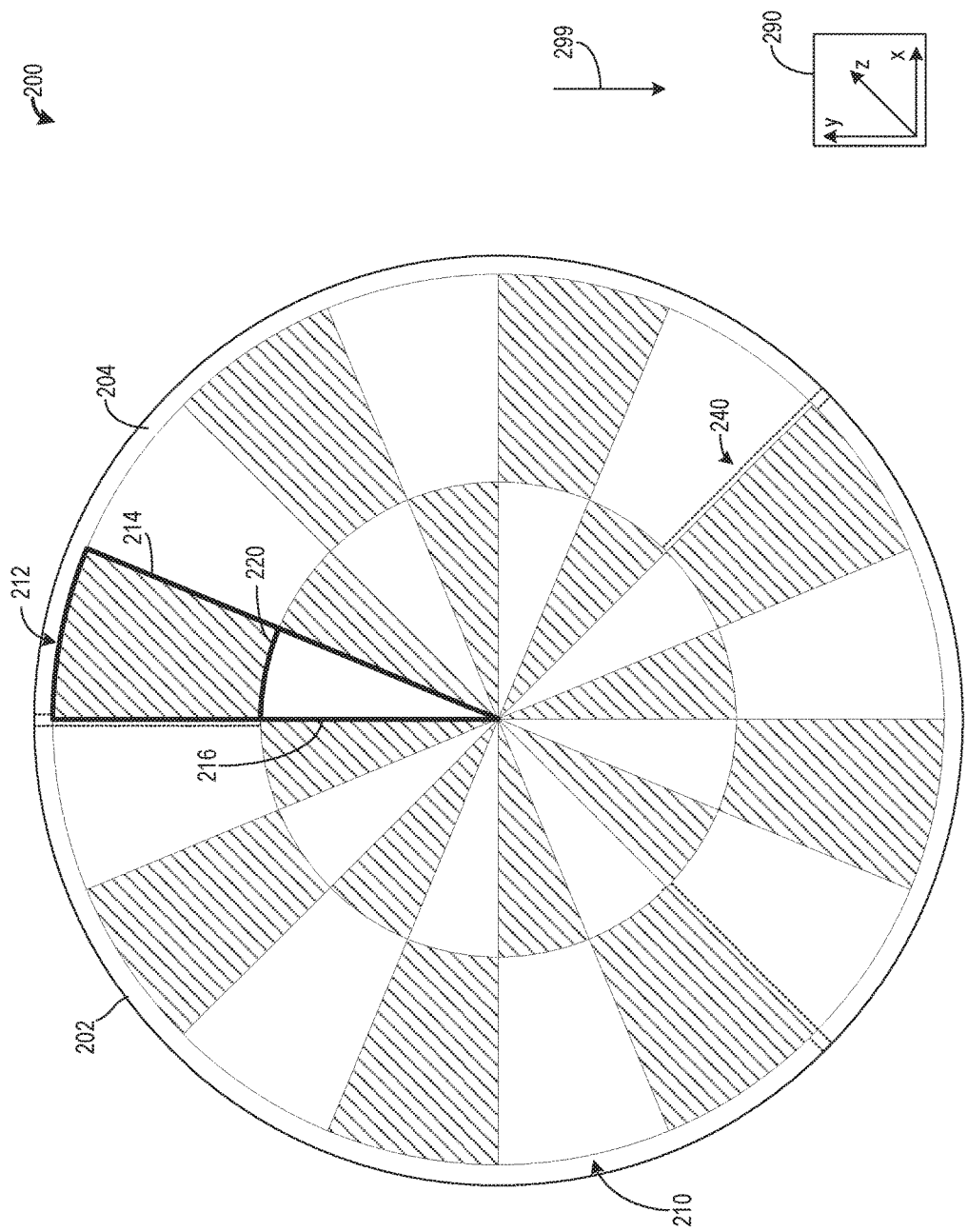
FIG. 2 shows a two-dimensional face-on view of a first embodiment of a mixer.
Figure 3:
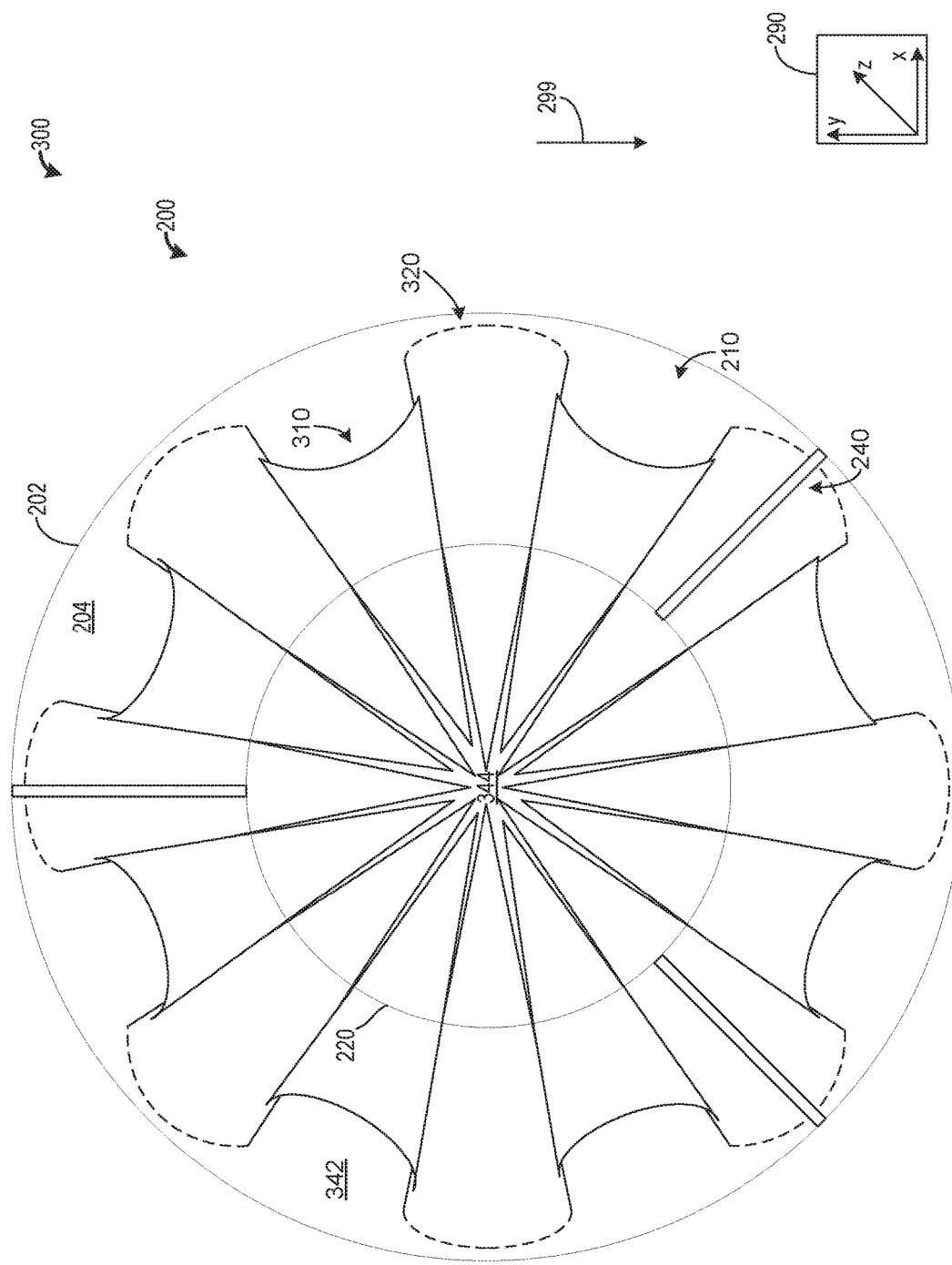
FIG. 3 shows a three-dimensional face-on view of the first embodiment.
Figure 4:
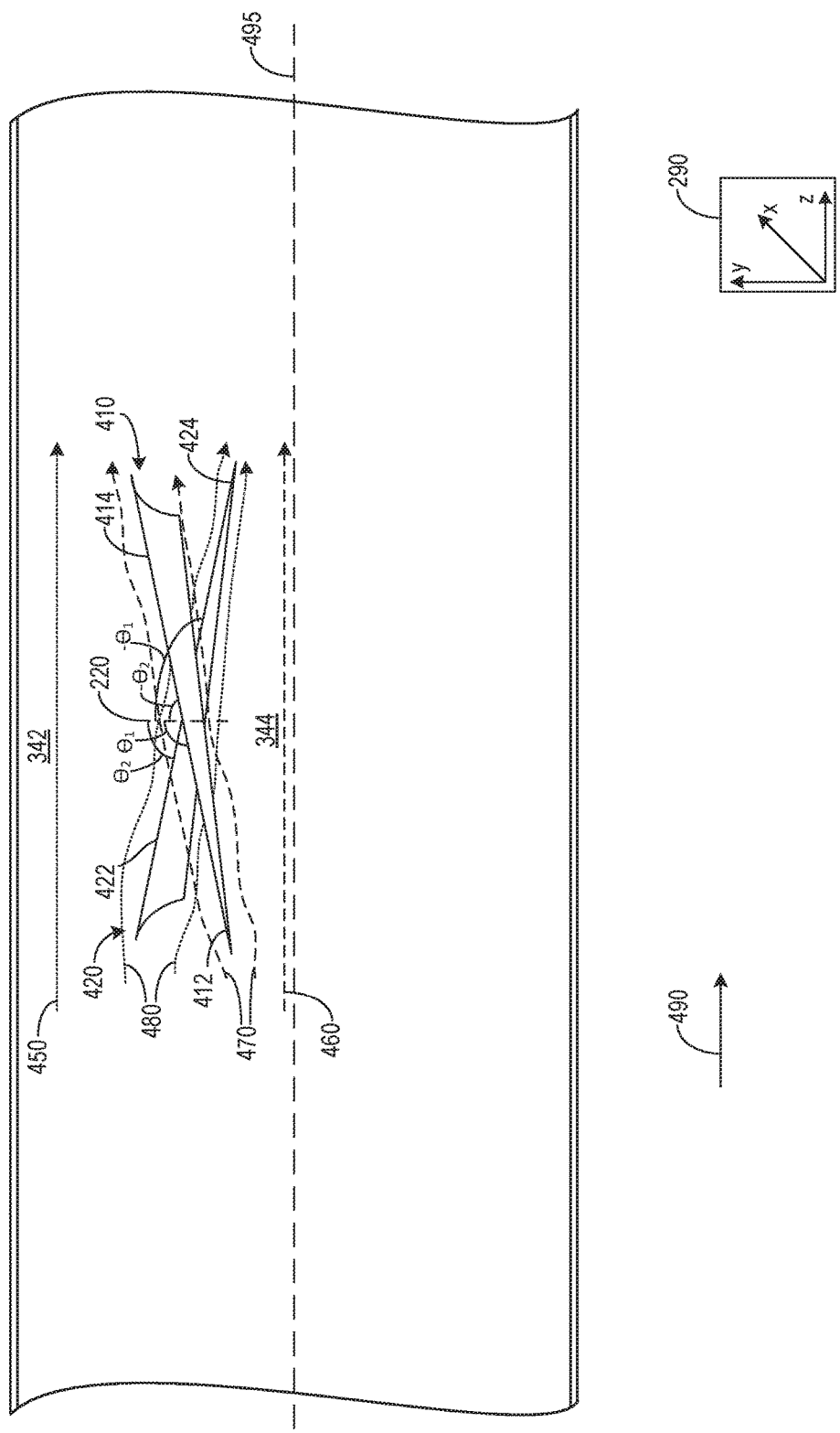
FIG. 4 shows a three-dimensional side-view of a portion of the first embodiment along with an example exhaust gas flow.
Figure 5:
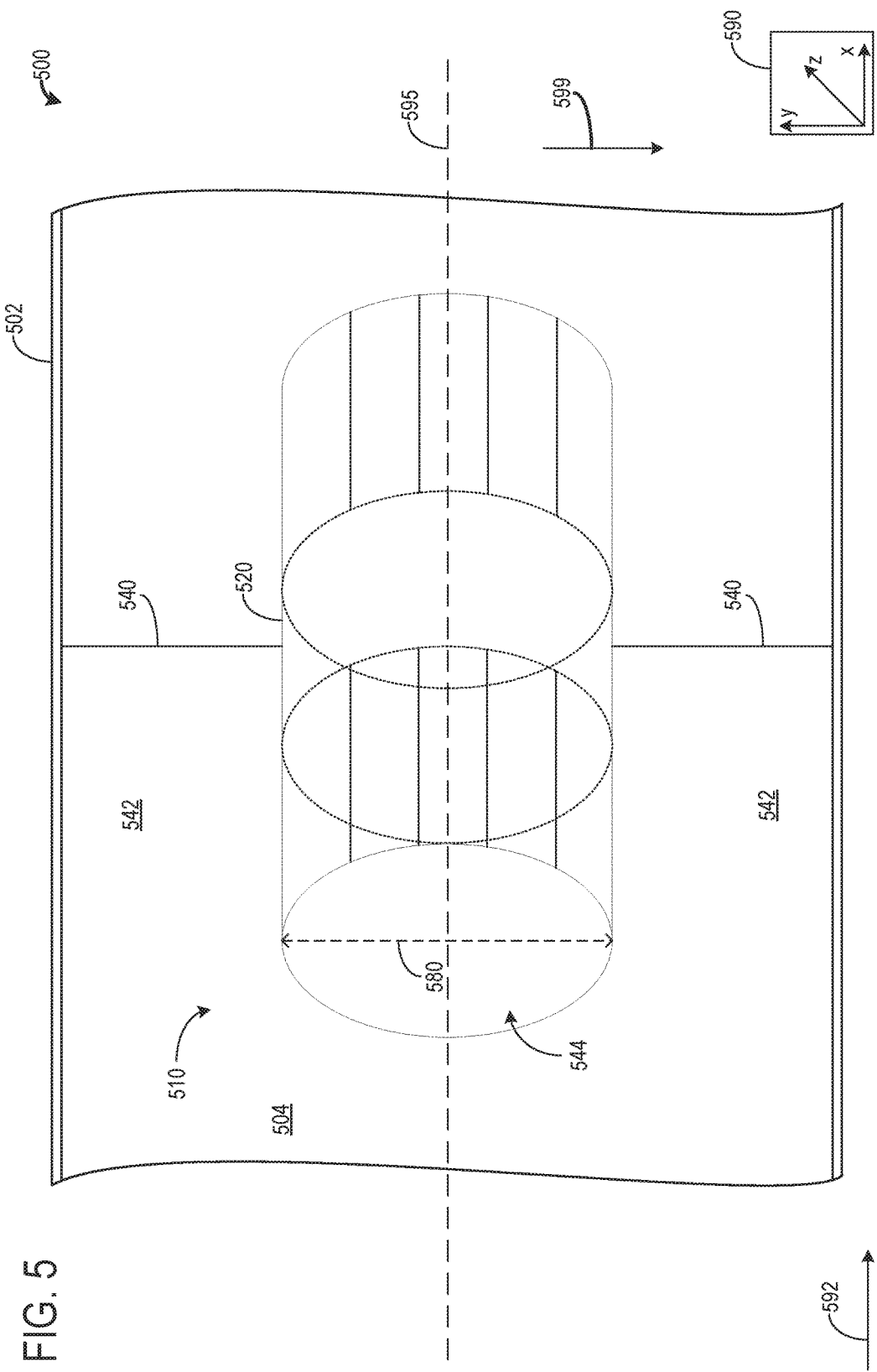
FIG. 5 shows a three-dimensional view of a second embodiment of a mixer.
Figure 6:
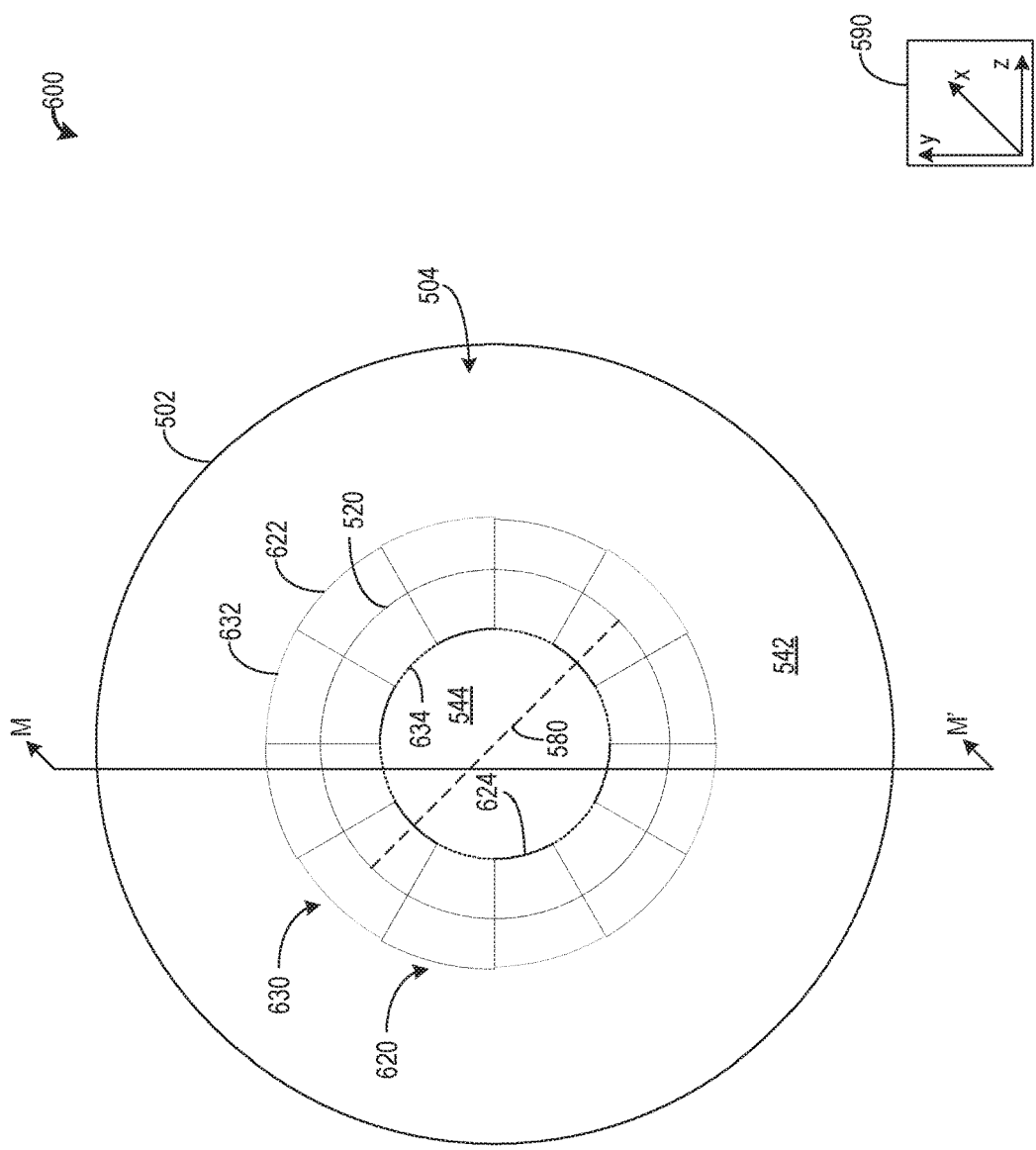
FIG. 6 shows a two-dimensional face-on view of the second embodiment.
Figure 7:
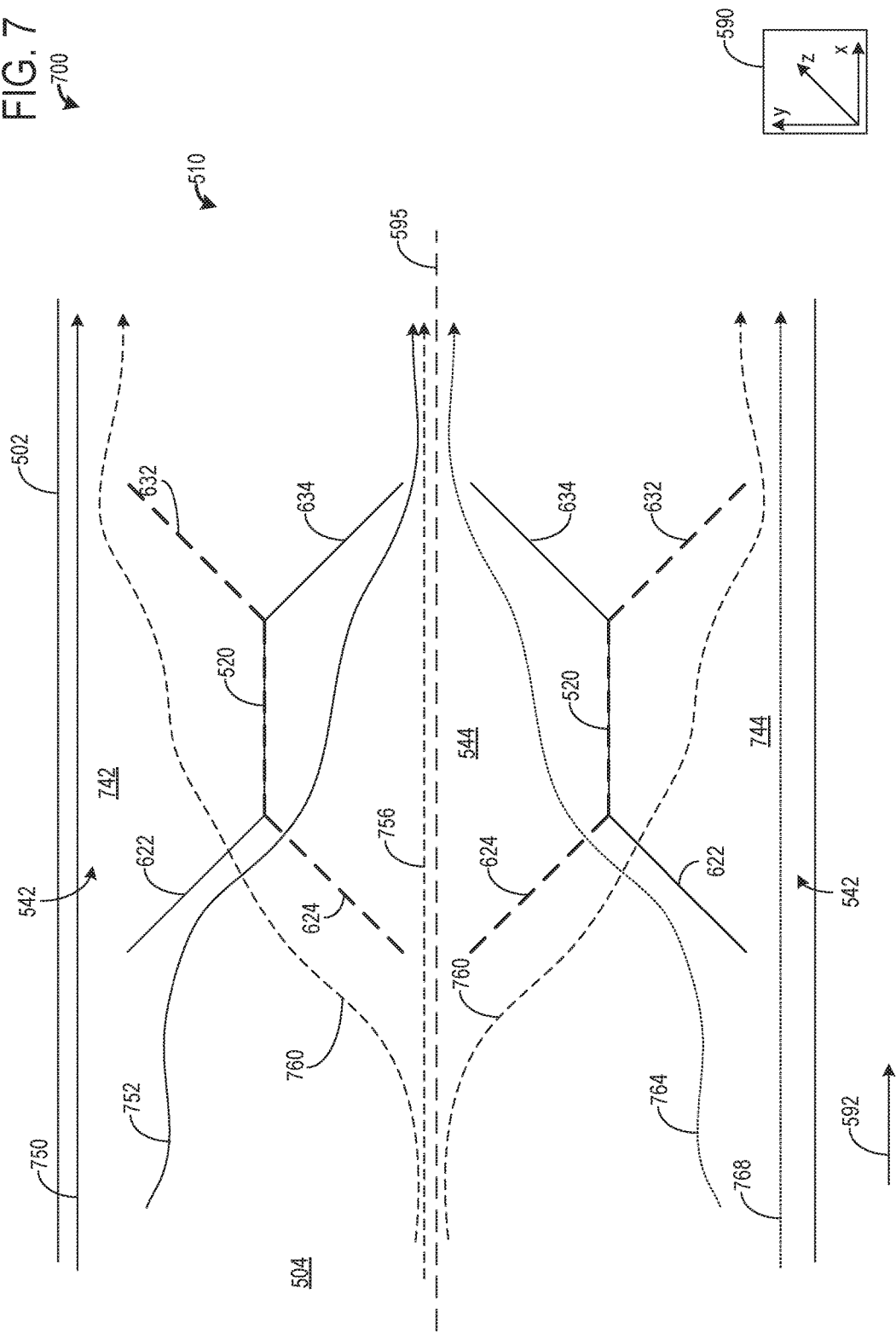
FIG. 7 shows a cross-section of the second embodiment along with an example exhaust gas flow therethrough.
Figure 8:
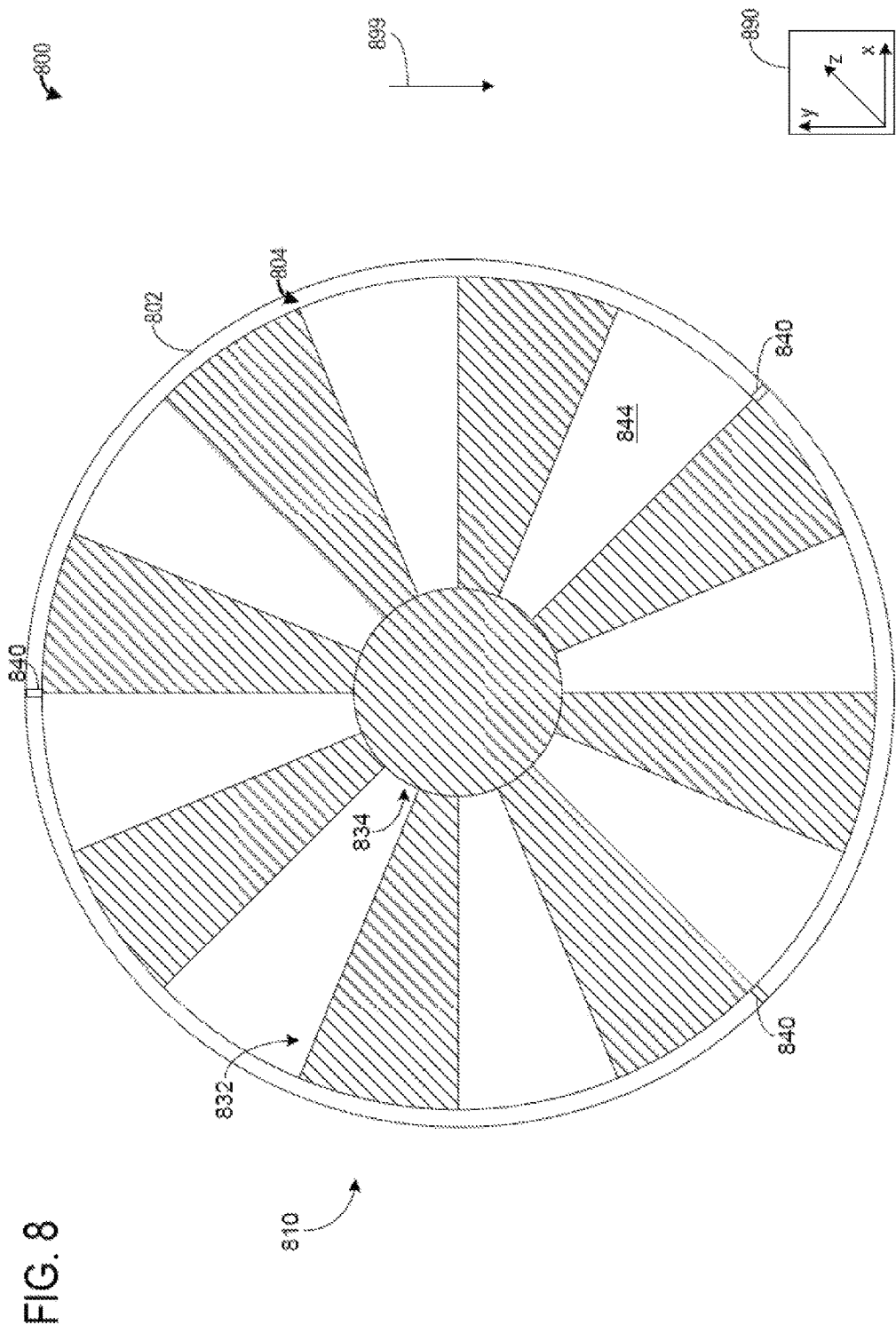
FIG. 8 shows a two-dimensional face-on view of a third embodiment of a mixer.

The following description relates to systems and methods for an engine having an engine exhaust system comprising a mixer. The mixer is located along an exhaust passage and comprises geometric features configured to perturb engine exhaust gas to improve exhaust gas mixing. A first embodiment of a mixer includes a plurality of blades evenly located around a ring concentric with a geometric center of an exhaust pipe, as shown in FIGS. 2 and 3. The blades are curved and angled relative to a direction of incoming exhaust gas flow. The blades are oriented about the ring oppositely to one another such that adjacent blades extend in opposite directions, as shown in FIG. 4. Additionally, a sample exhaust gas flow is depicted in FIG. 4. A second embodiment of a mixer includes forming upstream and downstream blades from a central ring of the mixer, as shown in FIG. 5. Upstream and downstream blades are separated from one another by the central ring. Adjacent upstream blades are oriented oppositely to one another. Similarly, adjacent downstream blades are oriented oppositely to one another, as shown in FIG. 6. Furthermore, upstream and downstream blades located directly across from each other about the central ring are oriented oppositely one another. An example exhaust flow through the second embodiment of the mixer is shown in FIG. 7. A third embodiment of a mixer includes a spherical body having a plurality of strips separated from each other by apertures, where the apertures are similarly in size and shape to the strips. The third embodiment further includes upstream and downstream strips separated from one another by a central portion of the spherical body. The upstream and downstream strips are misaligned with each other such that the upstream strips do not eclipse the downstream strips, as shown in FIG. 8. Exhaust gas may flow through a hollow body of the mixer and mix with exhaust gas in other regions of an exhaust passage, as shown in FIG. 9.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
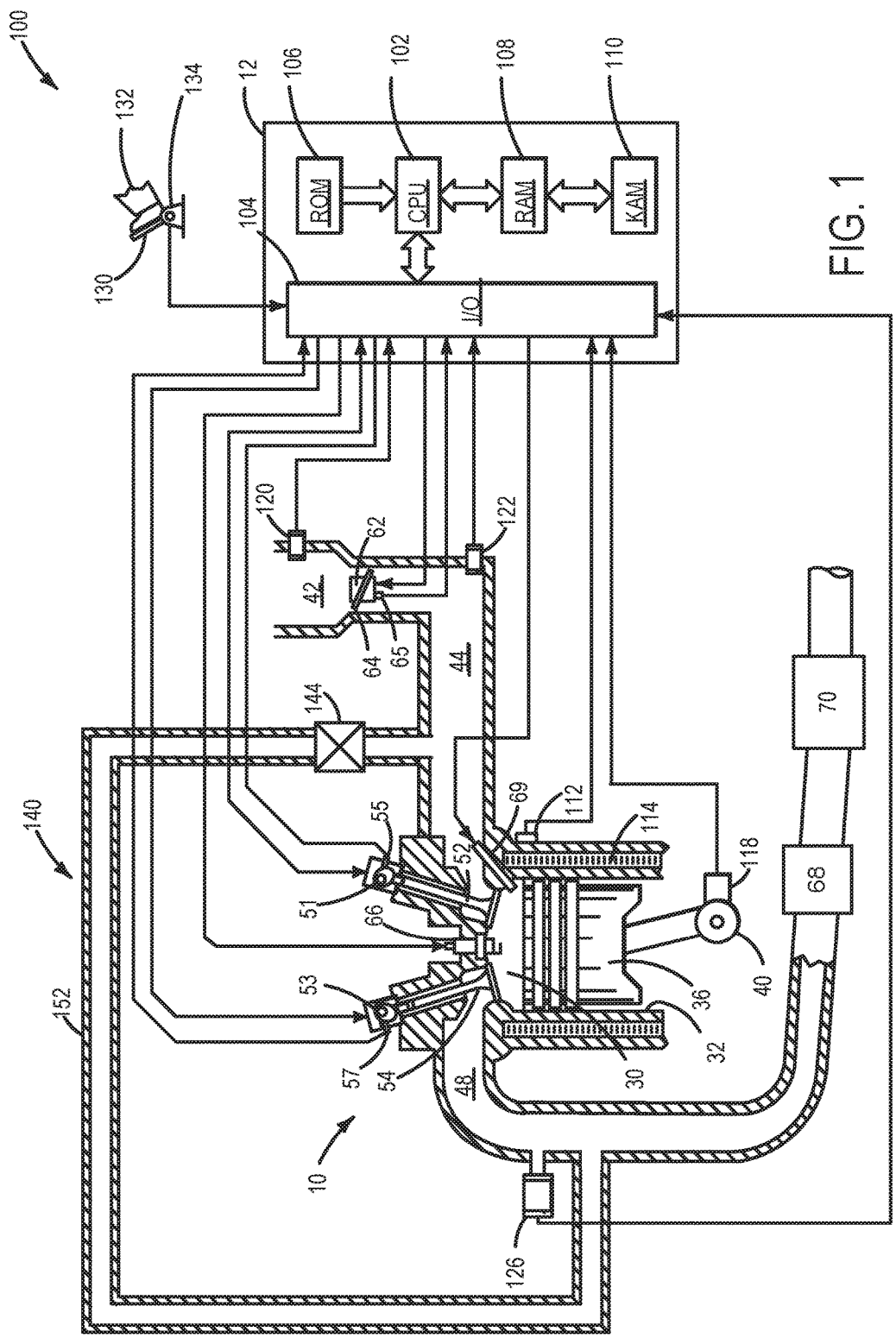
FIG. 1 illustrates an example cylinder of an engine.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of both the exhaust gas sensor 126 and a mixer 68. The device 70 may be a three way catalyst (TWC), $NO_x$ trap, selective catalytic reductant (SCR), various other emission control devices, or combinations thereof. In some examples, during operation of the engine 10, the emission control device 70 may be periodically reset by operating at least one cylinder of the engine within a particular air-fuel ratio.

The mixer 68 is shown upstream of the emission control device 70 and downstream of the exhaust gas sensor 126. In some embodiments, additionally or alternatively, a second exhaust gas sensor may be located between the mixer 68 and the emission control device 70 or downstream of the emission control device 70. The mixer 68 may be a single piece located along the exhaust passage 48. The mixer 68 may perturb an exhaust flow such that a homogeneity of an exhaust gas mixture is increased as the exhaust gas flows through the mixer 68. The mixer 68 may be shaped for optimal exhaust gas mixing based on exhaust passage 48 geometries. The mixer 68 will be described in further detail below.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller.

FIG. 1 depicts an example system comprising a mixer. The figures below depict exemplary embodiment of a mixer configurable to be used in the system of FIG. 1. Specifically, FIGS. 2-4 illustrate a first embodiment of a mixer, FIGS. 5-7 illustrate a second embodiment of a mixer, and FIGS. 8-9 illustrate a third embodiment of a mixer. As such, system 100 of FIG. 1 is configured to operate with one or more of the first, second, and/or third embodiments of the mixer. In this way, the first, second, and third embodiments may all sufficiently mix exhaust gas, despite their structural differences. Sufficiently mixing exhaust gas includes increasing a homogeneity of exhaust gas. Thus, the first, second, and third embodiments may redirect exhaust gas flow in an exhaust passage such that flow in the exhaust passage may increase in turbulence. In some examples, the first, second, or third mixer may be utilized based on an exhaust passage geometry (e.g., width, curves, bends, components, angles, etc.) to maximize exhaust gas mixing.

Thus, an example exhaust system may comprise an exhaust passage comprising an exhaust gas mixer having a plurality of protrusions extending from a ring concentric with a central axis of the exhaust passage with adjacent protrusions extending in different directions, and where an outer flow space is located between the mixer and an exhaust pipe and an inner flow space traverses through the mixer along the central axis. The protrusions may alternate with a first protrusion extending into the outer flow space, a second protrusion adjacent the first protrusion protrudes into the inner flow space. Thus, protrusions adjacent one another are angled and oriented oppositely one another. The protrusions may be angled relative to a direction of incoming exhaust gas flow. The protrusions may be curved with outer portions having a C shape and inner portions being pointed. The outer portions extend into the outer flow space and the inner portions extend into the inner flow space.

As another example, an exhaust system may comprise an exhaust passage comprising an exhaust gas mixer, a ring spaced away from an exhaust pipe with an outer flow space located between the ring and the exhaust pipe and an inner flow space traversing an entire length of the ring along a central axis of the exhaust pipe, and a plurality of alternating upstream protrusions where adjacent upstream protrusions extend in opposite directions, a plurality of alternating downstream protrusions where adjacent downstream protrusions extend in opposite directions, and where the upstream and downstream protrusions are physically coupled to opposite edges of the ring. A downstream protrusion of the downstream protrusions extends into the inner flow space and an upstream protrusion of the upstream protrusions, located directly upstream of the downstream protrusion, extends into the outer flow space. The upstream protrusions, downstream protrusions, and ring are impervious to exhaust gas flow. As an example, a cross-section of the mixer is a Z-shape. The mixer is symmetric and concentric with the exhaust pipe along the central axis. The mixer is a single machined piece fixed to the exhaust pipe via a plurality of supports.

Turning now to FIG. 2, a two-dimensional view of a first embodiment a mixer 200 is shown. The mixer 200 may be substantially similar to mixer 68 and may be used in the embodiment depicted with respect to FIG. 1. The mixer 200 is located along an exhaust passage 204 (e.g., exhaust passage 48 of FIG. 1) configured to receive engine exhaust gas. Geometrical features of the mixer 200 may promote exhaust gas mixing by increasing a turbulence and/or perturbation of the engine exhaust gas flow. This may lead to improved exhaust gas reactivity with aftertreatment devices and/or sensors located downstream of the mixer 200 in the exhaust passage 204.

An axis system 290 is shown comprising three axes, namely, an x-axis parallel to a horizontal direction, a y-axis parallel to a vertical direction, and a z-axis perpendicular to the x- and y-axes. A direction of gravity (arrow 299) points along the negative Y-axis direction. A direction of engine exhaust gas flow is substantially parallel to the z-axis.

The mixer 200 may be a single machined piece. The mixer 200 may comprise of one or more of a ceramic material, a metal alloy, a silicon derivative, or other suitable materials capable of withstanding high temperatures. Additionally or alternatively, the mixer 200 may comprise of one or more coatings and materials such that exhaust may contact surfaces of the mixer 200 without depositing soot on the mixer 200.

The mixer 200 is fixed within the exhaust passage 204 via a plurality of supports 240 (shown via dashed lines). The supports 240 may be cylindrically shaped rods substantially identical to one another (e.g., ±5% of manufacturing tolerances). It will be appreciated that the supports 240 may be different shapes without departing from the scope of the present disclosure (e.g., rectangular). In one example, there are exactly three supports 240 equally spaced about a circumference of a ring 220 of the mixer 200. By doing this, the supports 240 are 120° apart. Other numbers of supports (e.g., two or less or four or more) may be used with even or uneven dispersion along the circumference of the ring 220.

As shown, the supports 240 are coplanar with the ring 220 along a plane in the x- and y-axes. Welds, fusions, adhesives, and/or other suitable coupling elements may be used to physically couple opposite ends of the supports 240 an interior surface of the exhaust pipe 202 and the ring 220. Thus, the mixer 200 is not mechanically and/or electrically operated, and may not rattle, rotate, slide, and/or perform other forms of movement.

The exhaust pipe 202 and the ring 220 are concentric about a geometric center of the exhaust pipe 202 located along the z-axis, wherein the diameter of the ring 220 is less than the diameter of the exhaust pipe 202. In one example, the diameter of the ring 220 is exactly half the diameter of the exhaust pipe 202. A length of the supports 240 is substantially equal (e.g., within +5% of manufacturing tolerances) to a difference between the diameters of the ring 220 and the exhaust pipe 202. The ring 220 is circular (e.g., O-shaped), in one example. An inner flow space traverses through the ring 220 along the geometric center of the exhaust pipe 202 and/or mixer 200. Likewise, an outer flow space is located between the exhaust pipe 202 and the ring 220. As such, the ring 220 is spaced away from the geometric center of the exhaust pipe 202 and surfaces of the exhaust pipe 202.

A plurality of substantially identical blades 210 (e.g., within +5% of manufacturing tolerances) are physically coupled to the ring 220 and extend in upstream and downstream directions relative to a direction of incoming exhaust gas flow. In one example, none of the blades 210 are in-contact with one another or the exhaust pipe 202 and are only physically coupled to the ring 220. The blades 210 extend toward the inner and outer flow spaces described above. Specifically, diagonal-line pattern filled blades extend in the upstream direction and unfilled (e.g., all white) blades extend in the downstream direction. As shown, the blades 210 alternate such that adjacent blades do not extend in the same direction. In this way, the blades 210 may be protrusions extending from the ring 220.

The mixer 200 is rotationally symmetric. A cross-section of the mixer 200 taken along a plane of the ring 220 is undulating (e.g., wave-like and/or serpentine) due to the alternating curvature of the blades 210. In one example, the blades 210 are substantially C-shaped along an outer portion and narrow toward the inner portion forming a pointed tip. It will be appreciated that the blades 210 may be other shapes (e.g., V-shaped, W-shaped, Z-shaped, U-shaped, etc.) without departing from the scope of the present disclosure.

The blades 210 may be flat, linear blades. Alternatively, the blades 210 may be curved with a surface of the blades 210 being hemi-spherical such that a cross-section of the blades 210 along the x-axis is substantially C-shaped. Other shapes, features, and curvatures of the blades 210 may be realized without departing from the scope of the present disclosure (e.g., undulating, perforated, serpentine, etc.). In some examples, the blades 210 resemble a cone split into halves along its greatest height and omitting a base of the cone. In this way, the blades 210 are semi-circular with an outer extreme end (e.g., adjacent the exhaust pipe 202) resembling half an O-shape and an inner extreme end (e.g., adjacent the geometric center of the exhaust pipe 202) being pointed.

As an example, each blade of the blades 210 is a single, contiguous piece physically coupled to the ring 220 along its middle portion (e.g., between extreme ends of a blade of the blades 210). The blades 210 extend in radial directions obliquely to the ring 220. In one example, there are exactly 16 blades 210. Blades 210 directly adjacent one another are oriented oppositely one another. This means that similar extreme ends of adjacent blades point in opposite directions. Specifically, the outer extreme ends of a pair of adjacent blades point in opposite directions (e.g., upstream and downstream) and the inner extreme ends of the adjacent blades point in opposite direction. In this way, adjacent blades may alter exhaust gas flow oppositely, which may increase exhaust gas turbulence, as will be described below.

A single blade 212, of the blades 210, is indicated in bold line. A portion of the ring 220 corresponding to the blade 212 is also indicated in bold line. Bold lines are thicker than other lines shown in FIG. 2. The blade 212 comprises an outer portion 214 and an inner portion 216 relative to the ring 220. Specifically, the outer portion 214 extends radially outward to the outer flow space between the ring 220 and the exhaust pipe 202, whereas the inner portion 216 extends radially inward to the inner flow space interior to the ring 220 along a center of the mixer 200 (e.g., or a center of the exhaust pipe 202). Thus, the outer portion 214 is closer to the exhaust pipe 202 than the inner portion 216. The outer portion 214 extends in the upstream direction and the inner portion 216 extends in downstream direction. As such, the outer portion 214 may contact exhaust gas before the inner portion 216. As shown, an outer extreme end of the outer portion 214 (e.g., unfilled outer portions) extends in the downstream direction. Likewise, an inner extreme end of the inner portion 216 extends in the upstream direction. In one example, the blade 212 is a single, contiguous piece with a substantially C-shaped cross-section along the z-axis. It will be appreciated that the remaining blades of the blades 210 may be substantially identical to the blade 212 in shape and size. However, as described above, an orientation of the remaining blades is different such that adjacent blades face opposite directions.

The blade 212 narrows from the outer portion 214 to the inner portion 216 in the downstream direction. In one example, the blade 212 is pointed at a most downstream portion of the inner portion 216. As such, the two blades immediately adjacent to and on opposite sides of the blade 212 may be oriented in an opposite manner such that the two blades widen in the downstream direction. Said another way, the two adjacent blades are pointed at a most upstream portion of respective inner portions, while being widest at a most downstream portion of their respective outer portions. In this way, the blades 210 may generally be wider at outer portions while being narrower at inner portions.

FIG. 3 shows a 3-dimensional view 300 of the mixer 200 located in the exhaust passage 204 of the exhaust pipe 202. As such, components previously introduced in FIG. 2 may be similarly numbered in FIG. 3. The blades 210 are curved hemi-circularly with adjacent blades being complementary to one another (e.g., adjacent blades are halves of a cone). As an example, a first blade of the blades 210 may be concave and a second blade, adjacent to the first blade, of the blades 210 may be convex. As such, the blades 210 are substantially identical, with adjacent blades being rotated 180° about the ring 220 relative to one another. In one example, the curvature of the blades 210 may create a channel configured to guide exhaust gas flow along a body of a blade of the blades 210. Exhaust gas in a first channel may not mix with exhaust gas in a different channel while flowing through the mixer 200. In some examples, a portion of channels may face the exhaust pipe 202 while a remaining portion of channels may face a central axis of the exhaust passage 204.

As described above, the blades 210 may resemble half-cones without a base. Exhaust gas flowing a first blade may not mix with exhaust gas in a second blade regardless of a position of the blades along the ring 220. Said another way, exhaust gas flowing along a contour of a blade (e.g., half-cone) may not combine with exhaust gas flowing along a different blade in the mixer 200. In some examples, additionally or alternatively, the blades 210 may comprise features for altering exhaust gas flow such that exhaust flow may flow between the first and second blades. The features may include protrusions, perforations, vanes, etc.

Blades 210 with a dashed line outer edge near the exhaust pipe 202, herein referred to as first blades 310, indicate an outer portion of the blade extending in the downstream direction and an inner portion of the blade extending in the upstream direction. First blades 310 may comprise a channel for guiding exhaust gas facing the exhaust pipe 202. Blades 210 with a solid line outer edge near the exhaust pipe 202, herein referred to as second blades 320, indicate an outer portion of the blade extending in the upstream direction and an inner portion of the blade extending in the downstream direction. Second blades 320 may comprise a channel for guiding exhaust gas facing away from the exhaust pipe 202 toward the geometric center of the ring 220. By doing this, a portion of the blades may direct exhaust gas away from the exhaust pipe while a remaining portion of the blades 210 may direct exhaust gas toward the exhaust pipe, which will be further described below in FIG. 4. In one example, the outer and inner portions obliquely extend from the ring 220 in the upstream and downstream directions. Angles generated between the blades 210 and the ring 220 are further described in FIG. 4.

As shown, the first 310 and second 320 blades do not contact the exhaust pipe 202 or overlap with geometric center of the exhaust pipe 202. As such, the outer and inner flow spaces described above are shown. Specifically, the outer flow space 342 is annular and located between outer edges of the blades 210 and the exhaust pipe 202. Additionally, the inner flow space 344 is located between the inner (pointed) edges of the blades 210 and the geometric center of the exhaust pipe 202. Exhaust gas may flow uninterruptedly through the outer 342 or inner 344 flow spaces without contacting the mixer 200.

The first 310 and second 320 blades alternate along the ring 220. As such, none of the first blades 310 are adjacent and none of the second blades 320 are adjacent. Thus, each of the first blades 310 is separated by a blade of the second blades 320. Likewise, each of the second blades 320 is separated by a blade of the first blades 310. Adjacent first 310 and second 320 blades may be oblique or perpendicular to one another. As such, a side-on view of the blades 210, as shown in FIG. 4, may be substantially X-shaped. In one example, the blades 210 are uniformly distributed such that a relationship between first and second adjacent blades is the same as a relationship between third and fourth adjacent blades. Alternatively, in some embodiments, the blades 210 are not uniformly distributed and a relationship between first and second adjacent blades is different than a relationship between third and fourth adjacent blades.

In some embodiments, additionally or alternatively, the blades 210 may be perforated such that exhaust gas may flow through a body of the blades 210. The perforations may be square, circular, triangular, rectangular, and/or other shape suitable for allowing exhaust gas to flow through the corresponding opening.

Turning now to FIG. 4, it shows a side-on 3-dimensional view 400 of two blades of blades 210 of the mixer 200. Specifically, the two blades include a first blade 410 and a second blade 420 of first blades 310 and second blades 320 of FIG. 3, respectively. Ring 220 is depicted as a dash-dot line. Axis system 290 has been rotated to account for the different perspective of FIG. 4 compared to FIGS. 2 and 3. A direction of incoming exhaust gas flow (arrow 490) is substantially parallel to the z-axis and to a central axis 495. The central axis 495 may be a central axis to the exhaust pipe 202 and the mixer 200. Both the exhaust pipe 202 and the mixer 200 are symmetric about the central axis 495 along the x- and y-axes. It will be appreciated that the first 410 and second 420 blades are a portion of blades 210 and that blades 210 traverse around the ring 220 concentric to the central axis 495 of the exhaust pipe 202.

The first 410 and second 420 blades are described below with reference to inner and outer portions. As described above, outer portions of the blades 210 protrude between the ring 220 and the exhaust pipe 202 whereas inner portions protrude between the ring 220 and the central axis 495.

An angle $\theta_1$ is formed between an inner portion 412 of the first blade 410 and the ring 220. The angle $\theta_1$ is an obtuse angle, in one example, between 100 and 170 degrees. In one example, the angle $\theta_1$ is exactly 135°. An angle $-\theta_2$ is formed between an outer portion 414 of the first blade 410 and the ring 220. The angle $-\theta_2$ is an acute angle, in one example, between $-10$ and $-80$ degrees. In one example, the angle $-\theta_2$ is exactly $-45°$. As such, the angle $\theta_1$ and $-\theta_2$ are complementary angles, where a sum of the absolute value of both angles equals 180°. In this way, the first blade 410 is angled (e.g., inclined) relative to the direction of incoming exhaust gas flow (arrow 490) and may direct exhaust gas flow from adjacent the central axis 495 to adjacent the exhaust pipe.

Angle $\theta_2$ is formed between an outer portion 422 of the second blade 420 and the ring 220. Likewise, angle $-\theta_1$ is formed between an inner portion 424 of the second blade 420 and the ring 220. In this way, the second blade 420 is angled relative to the direction of incoming exhaust gas flow (arrow 490) and may direct exhaust gas flow from adjacent the exhaust pipe 202 to adjacent the central axis 495.

As shown, the first blade 410 is substantially identical to the second blade 420. However, the inner portion 412 faces an opposite direction than the inner portion 424. Specifically, the inner portion 412 faces a direction substantially opposite incoming exhaust gas flow and inner portion 424 faces a direction substantially parallel to incoming exhaust gas flow. Thus, the angles $\theta_1$ and $-\theta_1$ are opposite angles. Likewise, angles $\theta_2$ and $-\theta_2$ are opposite angles. In this way, first 410 and second 420 blades (e.g., adjacent blades of blades 210) are oriented exactly inversely to one another, in one example.

An examples exhaust gas flow through the mixer 200 is described below. It will be appreciated that the exhaust gas flow is a general exhaust gas flow and may deviate from the description below. Furthermore, the exhaust gas flow is described relative to only the first 410 and second 420 blades of the mixer 200. Thus, the exhaust gas flow through the mixer 200 may be more complex when including all the blades 210 (e.g., all 16 blades 210). The mixer 200 is configured to guide exhaust gas flows comprising different constituents, and therefore possibly different densities, to various regions on the exhaust passage 204. This may increase a number of exhaust gas collisions, resulting in greater exhaust gas turbulence and mixing compared to an exhaust passage not having a mixer.

Specifically, medium dash arrows depict exhaust gas flowing adjacent to the central axis 495 and small dash arrows depict exhaust gas flowing adjacent to the exhaust pipe 202. A portion of exhaust gas flowing adjacent to the exhaust pipe 202 flows through the outer flow space 342 without interacting with the mixer 200 (shown by small dash arrow 450). Likewise, a portion of exhaust gas flowing along the central axis 495 flows through the inner flow space 344 without contacting the mixer 200 (shown by medium dash arrow 460). In this way, arrows 450 and 460 represent two different portions of exhaust gas having different exhaust gas compositions that do not interact with the mixer. In one example, arrows 450 and 460 do not mix.

However, medium dash arrows 470 interact with the mixer 200 and flow along a contours of the first blade 410 (e.g., and other blades of the blades 210 oriented similarly to the first blade 410). In this way, exhaust gas near the central axis 495, interacts with a portion of the mixer 200, and flows toward the exhaust pipe 202, where the exhaust gas may collide with exhaust near the exhaust pipe (e.g., arrow 450). By doing this, arrow 450, which was previously unperturbed in its flow through the exhaust passage 204, is altered by medium dash arrows 470. As such, different exhaust gas flows composed of different constituents may merge and produce a more homogenous exhaust gas flow. Furthermore, the exhaust gas flows may ricochet due to the merging of the different exhaust gas flows, resulting in a greater number of exhaust gas collisions. This may result in further mixing of exhaust gas.

Similarly, small dash arrows 480 interact with the mixer 200 and flow along contours of the second blade 420. As shown, the arrows 480 do not mix with arrows 470 while flowing through the mixer 200. The arrows 480 are redirected by the second blade 420 from the outer flow space 342 to the inner flow space 344. In this way, exhaust gas near the exhaust pipe 202, interacts with a portion of the mixer 200, and flows toward the central axis 495, where the exhaust gas may collide with unmixed exhaust gas (e.g., arrow 460) near the central axis. In this way, both the outer flow space 342 and the inner flow space 344 comprise medium and small dash arrows. Thus, the mixer 200 may increase a homogeneity of an exhaust gas flow compared to an exhaust passage not having the mixer.

Turning now to FIG. 5, it shows a second embodiment 500 of an exemplary exhaust gas mixer 510 (e.g., mixer 68 shown in FIG. 1). The mixer 510 and the mixer 200 may be substantially similar, where both mixers comprise a ring with blades projecting into outer and inner flow spaces. However, the mixer 510 further comprises upstream and downstream blades being misaligned with one another. In some examples, both the mixers may be located in exhaust passage 48 of FIG. 1.

An axis system 590 is shown comprising three axes, namely, an x-axis parallel to a horizontal direction, a y-axis parallel to a vertical direction, and a z-axis perpendicular to the x- and y-axes. A direction of gravity (arrow 599) points along the negative Y-axis direction. A direction of engine exhaust gas flow, shown by arrow 592, is substantially parallel to central axis 595 of exhaust pipe 502.

The mixer 510 may be a single machined piece. The mixer 510 may comprise of one or more of a ceramic material, a metal alloy, a silicon derivative, or other suitable materials capable of withstanding high temperatures. Additionally or alternatively, the mixer 510 may comprise of one or more coatings and materials such that exhaust may contact surfaces of the mixer 510 without depositing soot on the mixer 510.

The mixer 510 is fixed within the exhaust passage 504 via a plurality of supports 540 extending from a central portion of the mixer 510 to an interior surface of the exhaust pipe 502. The supports 540 may be cylindrically shaped rods substantially identical to one another (e.g., ±5% of manufacturing tolerances). It will be appreciated that the supports 540 may be different shapes without departing from the scope of the present disclosure (e.g., rectangular). In one example, there are exactly three supports 540 equally spaced about a circumference of a ring 520 of the mixer 510. By doing this, the supports 540 are 120° apart, in one example. Other numbers of supports (e.g., two or less or four or more) may be used with even or uneven dispersion along the circumference of the ring 220.

As shown, the supports 540 are coplanar with the ring 520 along a plane in the x- and y-axes. Welds, fusions, adhesives, and/or other suitable coupling elements may be used to physically couple opposite ends of the supports 540 an interior surface of the exhaust pipe 502 and the ring 520. Thus, the mixer 510 is not mechanically and/or electrically operated, and may not rattle, rotate, slide, and/or perform other forms of movement during engine operation.

The exhaust pipe 502 and the ring 520 are concentric about the central axis 595. The mixer 510 is hollow such that gas may flow directly therethrough. Thus, the mixer 510 comprises an inner flow space 544 located between the ring 520 and the central axis 595. The inner flow space 544 traverses an entire length of the mixer 510. Additionally, an outer flow space 542 is annular and located between the mixer 510 and interior surfaces of the exhaust pipe 502.

The ring 520 is circular (e.g., O-shaped), in one example. A diameter 580 of the ring 520 is less than the diameter of the exhaust pipe 502. In one example, the diameter of the ring 520 is exactly half the diameter of the exhaust pipe 502. A length of the supports 540 is substantially equal (e.g., within +5% of manufacturing tolerances) to a difference between the diameters of the ring 520 and the exhaust pipe 502. It will be appreciated that the ring 520 may be other suitable shapes (e.g., triangular, rectangular, square-like, pentagonal, etc.) without departing from the scope of the present disclosure.

Solid lines on the mixer 510 indicate cut-out regions producing a plurality of blades to protrude into the outer 542 and inner 544 flow spaces. The blades are substantially identical in shape, length, and width. As an example, a length of the blades is less than diameter 580 of the mixer 510. Furthermore, a length of the ring 520, along the x-axis, may be substantially equal to the length of the blades. Additionally or alternatively, the length of the ring 520 may be greater than or less than the length of the blades. The blades may perturb exhaust gas flowing through the exhaust passage 504, as will be described below.

Turning now to FIG. 6, it shows a face-on view 600 of the mixer 510 with blades 610. Upstream blades 620 are shown in solid lines and downstream blades 630 are shown in small dashed lines. The upstream blades 620 are closer to an engine (e.g., engine 10 of FIG. 1) than downstream blades 630. In this way, the upstream blades 620 may receive exhaust gas before the downstream blades 630. As described above, each of the blades 610 are substantially identical to each other. Thus, the upstream blades 620 and downstream blades 630 are substantially identical. Additionally, each of the upstream blades 620 are substantially identical to each other. Likewise, each of the downstream blades 630 are substantially identical. It will be appreciated that the upstream blades 620 and downstream blades 630 may be different without departing from the scope of the present disclosure.

The upstream blades 620 comprise a plurality of upstream exterior facing blades 622 and a plurality of upstream interior facing blades 624. The upstream exterior blades 622 extend into the outer flow space 542 and the upstream interior blades 624 extend toward the inner flow space 544. The upstream exterior 622 and upstream interior 624 blades alternate. Thus, one of the upstream interior blades 624 is located between and separates two of the upstream exterior blades 622 and vice-versa. Likewise, the downstream blades 630 comprise a plurality of downstream exterior facing blades 632 and a plurality of downstream interior facing blades 634. The downstream exterior blades 632 protrude into the outer flow space 542 and the downstream interior blades 634 protrude into the inner flow space 544. The downstream exterior blades 632 and downstream interior blades 634 are substantially identical to the upstream exterior blades 622 and upstream interior blades 624, respectively, in shape, size, and orientation. Thus, the downstream exterior blades 632 and downstream interior blades 634 alternate. As such, each one downstream interior blades 634 is located between each of the downstream exterior blades 632, and vice-versa.

The upstream blades 620 and downstream blades 630 are shown rotationally off-set and/or misaligned with one another such that upstream exterior blades 622 do not eclipse downstream exterior blades 632. Likewise, upstream interior blades 624 do not eclipse downstream interior blades 634. In this way, the upstream exterior blades 622 and the downstream interior blades 634 are aligned along the x-axis, parallel to incoming exhaust gas flow. Likewise, the downstream exterior blades 632 and the upstream exterior blades 622 are aligned along the x-axis, parallel to incoming exhaust gas flow. The upstream 622 and downstream 632 exterior blades alter exhaust gas flow in outer flow space 542 and upstream 624 and downstream 634 interior blades alter exhaust gas flow in the inner flow space 544.

The upstream 620 and downstream 630 blades are impervious to exhaust gas flow. As such, exhaust gas may not flow through the upstream 620 and downstream 630 blades. Additionally, the ring 520 is impervious to exhaust gas flow. In some examples, one or more of the upstream blades 620, downstream blades 630, and ring 520 may be perforated and/or comprise other openings for allowing exhaust gas to flow therethrough.

Turning now to FIG. 7, a cross-section 700 taken along cut-out plane M-M' of FIG. 6 is shown. The cross-section 700 shows a portion of the mixer 510 fixedly located along the exhaust passage 504 in the exhaust pipe 502. Supports substantially prevent the mixer 510 from moving and/or vibrating while engine exhaust gas flow by and/or through the mixer 510. In this way, the mixer 510 is not electrically and/or mechanically actuated, and as a result, does not slide and/or rotate.

The cross-section 700 shows top 710 and bottom 720 portions of the mixer 510 spaced about the central axis 595. The top 710 and bottom 720 portions include upstream exterior blades 622, upstream interior blades 624, downstream exterior blades 632, and downstream interior blades 634. Upstream exterior blades 622 and downstream interior blades 634 are contiguous and physically coupled to portions of the ring 520 (shown in solid lines). Upstream interior blades 624 and downstream exterior blades 632 are contiguous and physically coupled to portions of the ring 520 (shown in dashed lines). Contiguous portions of the mixer 510 may work in conjunction to alter an exhaust gas flow, as will be described below.

Inner flow space 544 is located between the top 710 and bottom 720 portions along the central axis 595. The outer flow space 542 includes a top outer flow space 742 and a bottom outer flow space 744. The top outer flow space 742 and bottom outer flow space 744 sandwich the inner flow space 544. The mixer 510 separates the outer flow space 542 and the inner flow space 544.

Exhaust gas flow flowing adjacent to the exhaust pipe 502 toward the top outer flow space 742 is indicated by solid line arrows. Exhaust gas flow flowing adjacent to the central axis 595 toward the inner flow space 544 is indicated by medium dashed line arrows. Exhaust gas flow flowing adjacent to the exhaust pipe toward the bottom outer flow space 744 is indicated by small dashed line arrows. Large dashed lines are larger than medium dashed lines, which are larger than small dashed lines. The different arrows represent different exhaust gas flows having different constituents. As such, an exhaust gas homogeneity upstream of the mixer 510 has a low homogeneity.

A first solid line arrow 750 flows toward the top outer flow space 742 may flow uninterruptedly through the top outer flow space 742 without interacting with the top portion 710 of the mixer 510. Alternatively, a second solid line arrow 752 interacts with the upstream exterior blades 622 of the top portion 710. The second solid line arrow 752 follows a shape of the upstream exterior blades 622, ring 520, and downstream interior blades 634 toward the inner flow space 544. As such, the exhaust gas is redirected from near the exhaust pipe 502 to near the central axis 595 via the mixer 510.

A first medium dashed arrow 756 flows toward the inner flow space 544 may flow uninterruptedly through the inner flow space 544 without interacting with the mixer 510. However, the second solid line arrow 752 may interact and merge with the first medium dashed arrow 756. In this way, exhaust gas near the central axis 595 may mix with exhaust gas initially flowing toward the top outer flow space 704 via the mixer 510. A second medium dashed arrow 760 may interact with the upstream interior blades of the top portion 710. The second medium dashed arrow 760 follows a shape of the upstream interior blades 624, ring 520, and downstream exterior blades 634 toward the top outer flow space 742. As such, the second medium dashed arrow 760 may combine with the first solid line arrow 750 in the top outer flow space 742. A third medium dashed arrow 764 may interact with the upstream interior blades of the bottom portion 720. The third medium dashed arrow 764 may follow a shape of the upstream interior blades 624, ring 520, and downstream exterior blades 632 toward the bottom outer flow space 744. As such, the third medium dashed arrow 764 may be redirected from flowing toward the inner flow space 544 to flowing toward the bottom outer flow space 764.

A first small dashed arrow 768 flows toward the bottom outer flow space 706 may flow through the bottom outer flow space 744 without interacting with the mixer 510. However, the first small dashed arrow 768 may merge with the third medium dashed arrow 764 in the bottom outer flow space 744. A second small dashed arrow 772 may interact with the upstream exterior blades 622 of the bottom portion 720. The second small dashed arrow 772 may follow a shape of the upstream exterior blades 622, ring 520, and downstream interior blades 634 toward the inner flow space 544. As such, the second small dashed arrow 772 may merge with the second solid line arrow 752 and the first medium dashed arrow 756 in the inner flow space 544.

As such, the top outer flow space 742 comprises solid and medium dashed line arrows, bottom outer flow space 744 comprises medium and small dashed line arrows, and inner flow space 544 comprises solid line, medium dashed line, and small dashed line arrows. As such, exhaust gas flow downstream of the mixer 510 has a greater homogeneity than exhaust gas upstream of the mixer 510. Additionally, the exhaust gas in the different flow spaces may further mix due to turbulence generated by redirecting and forcing exhaust gas to collide. By doing this, constituents flowing in different regions of the exhaust passage 504 may combine thereby increasing exhaust gas homogeneity. As such, components downstream of the mixer 510 may realize increased efficiency and performance, as will be described below.

Turning now to FIG. 8, it shows a face-on view of a mixer 800 located along an exhaust passage 804 in exhaust pipe 802. In one example, exhaust passage 804 and the mixer 800 are substantially identical to the exhaust passage 48 and mixer 68 of FIG. 1, respectively. The mixer 800 may differ from the mixer 510 and/or the mixer 200 in that the mixer 800 is spherical. Other differences will be described in detail below.

An axis system 890 is shown comprising three axes, namely, an x-axis parallel to a horizontal direction, a y-axis parallel to a vertical direction, and a z-axis perpendicular to the x- and y-axes. A direction of gravity (arrow 899) points along the negative Y-axis direction. A direction of engine exhaust gas flow is substantially parallel to the z-axis.

The mixer 800 may be a single machined piece. The mixer 800 may comprise of one or more of a ceramic material, a metal alloy, a silicon derivative, or other suitable materials capable of withstanding high temperatures. Additionally or alternatively, the mixer 800 may comprise of one or more coatings and materials such that exhaust may contact surfaces of the mixer 800 without depositing soot on the mixer 800.

The mixer 800 is fixed within the exhaust passage 804 via a plurality of supports 840 (shown via dashed lines). The supports 840 may be cylindrically shaped rods substantially identical to one another (e.g., ±5% of manufacturing tolerances). It will be appreciated that the supports 840 may be different shapes without departing from the scope of the present disclosure (e.g., rectangular). In one example, there are exactly three supports 840 equally spaced about a circumference of a ring 820 of the mixer 800. By doing this, the supports 840 are 120° apart. Other numbers of supports (e.g., two or less or four or more) may be used with even or uneven dispersion along the circumference of the ring 820.

As shown, the supports 840 are coplanar with the ring 820 along a plane in the x- and y-axes. Welds, fusions, adhesives, and/or other suitable coupling elements may be used to physically couple opposite ends of the supports 840 an interior surface of the exhaust pipe 802 and the ring 820. Thus, the mixer 800 is not mechanically and/or electrically operated, and may not rattle, rotate, slide, and/or perform other forms of movement.

The exhaust pipe 802 and the ring 820 are concentric about a geometric center of the exhaust pipe 802 located along the z-axis, wherein the diameter of the ring 820 is less than the diameter of the exhaust pipe 802. The ring 820 corresponds to a greatest diameter of the mixer 800. As such, the diameter of the mixer 800 decreases in upstream and downstream directions from the ring 820. In one example, the diameter of the ring 820 is exactly half the diameter of the exhaust pipe 202.

An outer flow space 842 is annular and located between the mixer 800 and the exhaust pipe 802. An inner flow space 844 is located inside a volume of the mixer 800 fluidly coupling portions of the exhaust passage 804 directly upstream and downstream of the mixer 800. In this way, the mixer 800 is hollow and configured to flow exhaust gas therethrough. Thus, the inner flow space traverses an entire length of the mixer 800. In one example, the mixer 800 is a hollow sphere. Thus, the mixer 800 is symmetrical. It will be appreciated that the mixer 800 may be other shapes (e.g., trigonal pyramidal, cubical, rectangular prism, etc.) without departing from the scope of the present disclosure.

An upstream half 810 of the mixer 800 is shown in FIG. 8. As such, a downstream half is located directly behind the upstream half 860 along the exhaust passage 804. The ring 820 is located directly between the upstream 810 and downstream halves.

The mixer 800 comprises upstream strips 830 physically coupled to an upstream circular flow guide 832 and an upstream edge of the ring 820. The upstream strips 830 and upstream circular flow guide 832 are indicated in striped lines. Blanks spaces between each of the upstream strips 830 correspond to upstream flow spaces 834. As shown, the upstream flow spaces 834 and upstream strips 830 alternate such that the strips are not adjacent. The upstream strips 830 and upstream circular flow guide 832 are impervious to exhaust gas flow while the upstream flow spaces 834 are configured to readily admit exhaust gas flow into the inner flow space 844. In some examples, additionally or alternatively, the upstream strips 830 and/or the upstream circular flow guide 832 may be perforated to allow exhaust gas to flow therethrough and into the inner flow space 844.

The upstream circular flow guide 832 is located along a geometric center of the mixer 800 and the exhaust pipe 802. The upstream strips 830 extend in a downstream direction from the upstream circular flow guide 832 to the ring 820. The striped portions are evenly spaced around the upstream circular flow guide 832. As shown, exactly eight upstream strips 830 are coupled to the upstream circular flow guide 832. However, other numbers may exist without departing from the scope of the present disclosure. Due to a curvature of the mixer 800 (e.g., a spherical curvature), the upstream strips 830 extend in a curved manner, oblique to a direction of incoming exhaust gas flow parallel to the z-axis.

Turning now to FIG. 9, it shows a side-on three-dimensional view 900 of the mixer 800. The view 900 further includes an exemplary exhaust gas flow, shown by arrow 892, flowing through the exhaust passage 804 and interacting with the mixer 800. Axis system 890 has been rotated to account for the altered perspective of view 900 from the face-on view shown in FIG. 8. A direction of incoming exhaust gas is parallel to arrow 992 and the z-axis. A central axis is shown via dashed line 995 which passes through a geometric center of the exhaust pipe 802 and a geometric center of the mixer 800. A vertical axis 998 is shown along parallel to a plane of the ring 820 formed in the x- and y-axes. In one example, the vertical axis 998 is located directly between upstream 810 and downstream 910 halves of the mixer 800. As such, the ring 820 separates the upstream 810 and downstream 910 halves.

The downstream half 910 may be substantially identical to the upstream half 810 and flipped about the vertical axis 998 (e.g., or y-axis). Additionally, the downstream half 910 may be rotated about the central axis 995 relative to the upstream half 810 such that downstream strips 930 are misaligned with upstream strips 830. In this way, the downstream strips 930 are directly downstream of and aligned with the upstream flow spaces 834 along the z-axis.

Likewise, the upstream strips 830 are directly upstream of aligned with downstream flow spaces 934. As such, the downstream half 910 is rotationally misaligned with the upstream half 810. The upstream flow guide 832 is located directly upstream of and is aligned with a downstream flow guide 932 along the central axis 995. The upstream flow guide 832 is substantially identical to the downstream flow guide 932. Furthermore, the upstream strips 830 are substantially identical to the downstream strips 930. Still further, the upstream flow spaces 834 are substantially identical to the downstream flow spaces 934.

An exemplary exhaust gas flow is described below. The mixer 800 may impede an exhaust gas flow. This may redirect the exhaust gas flow and increase randomness within the exhaust passage 804. As such, exhaust gas mixing may increase and result in increased homogeneity compared to exhaust gas in an exhaust passage without the mixer 800.

Specifically, exhaust gas flow is shown by medium dash arrow 950, large dash arrow 960, and small dash arrow 970. Large dashes are bigger than medium dashes, which are bigger than small dashes. The different exhaust arrows may represent exhaust flows having different exhaust gas compositions.

The medium dash arrow 950 flows in a region of the exhaust passage 804 above the central axis 995 relative to a direction of gravity (arrow 899) proximal to the exhaust pipe 802. A first medium dash arrow 952 deviates from the medium dash arrow 950 and flows toward the outer flow space 842. The first medium dash arrow 952 flows through the outer flow space 842 without interacting with the mixer 800. A second medium dash arrow 954 deviates from the medium dash arrow 950 and flows through upstream flow spaces 834 by either flowing around upstream strips 830 or colliding with upstream strips 830. The second medium dash arrow 954 flows through the inner flow space 844 and exits the mixer 800 via downstream flow spaces 934 along the central axis 995. As such, the second medium dash arrow 954 rotates and turns in the inner flow space 844 to flow out the mixer 800. In this way, a turbulence of the second medium dash arrow 954 is increased. A third medium dash arrow 956 flows into the inner flow space 844 after colliding with the upstream strips 830 or directly flowing through the upstream flow spaces 834. The third medium dash arrow 956 flows around the inner flow space 844 and collides with the downstream flow guide 932, which directs the third medium dash arrow 956 to a region of the inner flow space 844 below the central axis 995. The third medium dash arrow 956 collides with interior surfaces of the downstream strips 930 before tumbling down and flowing through downstream flow spaces 934 to the outer flow space 842. As such, the first medium dash arrow 952 and the third medium dash arrow 956 flow in opposite regions of the outer flow space 842, despite originating from a single exhaust gas flow (e.g., medium dash arrow 950).

The large dash arrow 960 flows in a region of the exhaust passage 804 along the central axis 995 distal to the exhaust pipe 802. A first large dash arrow 962 flows around or into the upstream flow guide 832 and enters the inner flow space 844 via the upstream flow spaces 834. The first large dash arrow 962 collides with interior surfaces of downstream strips 930 and is directed in an upward direction, flowing through downstream flows spaces 934 and into a portion of the outer flow space 842 above the central axis 995. As such, the first large dash arrow 962 may merge with first medium dash arrow 952. A second large dash arrow 964 flows around or into the upstream flow guide 832 and enters the inner flow space 844 via the upstream flow spaces 834. The second large dash arrow 964 flows around the inner flow space 844 and flows out the downstream flow spaces 934 along the central axis 995. As such, the second large dash arrow 964 may combine with second medium dash arrow 954. A third large dash arrow 966 flows around or into the upstream flow guide 832 and enter the inner flow space 844 via the upstream flow spaces 834. The third large dash arrow 966 flows through the inner flow space 844, collides with interior surfaces of the downstream strips 930, and flows toward the outer flow space 842 located below the central axis 995. As such, the third large dash arrow 966 may combine with medium dash arrow 956.

The small dash arrow 970 flows toward the outer flow space 842 in a region of the exhaust passage 804 below the central axis 995 relative to a direction of gravity (arrow 899) proximal to the exhaust pipe 802. A first small dash arrow 972 deviates from the small dash arrow 970 and flows through the outer flow space 842 without interacting with the mixer 800. A second small dash arrow 974 flows through upstream flow spaces 834 by either flowing around or colliding with upstream strips 830 and enters the inner flow space 844. The second small dash arrow 974 flows around the inner flow space 844 and exits the downstream flow spaces 934 along the central axis 995. As such, the second small dash arrow 974 may merge with second medium dash arrow 954 and/or second large dash arrow 964. A third small dash arrow 976 flows through the upstream flow spaces 834 and enters the inner flow space 844. While in the inner flow space 844, the third small dash arrow 976 collides with interior surfaces of upstream 830 and downstream 930 strips along with the downstream circular flow guide 932. In this way, the trajectory of the third small dash arrow 976 is altered such that it flows out of the downstream flow spaces 934 into the outer flow space 842 above the central axis 995. As such, the third small dash arrow 976 may merge with first medium dash arrow 952 and second large dash arrow 962.

Thus, the mixer 800 may improve exhaust gas homogeneity altering an exhaust gas flow via upstream 830 and downstream 930 strips. This allows exhaust gas to flow from adjacent to the exhaust pipe 802 to adjacent the central axis 995 and vice-versa. In this way, constituents may mix, thereby increasing homogeneity. Components downstream of the mixer 800 may realize improve performance. For example, an SCR device may be reduced more efficiently by injecting urea upstream of the mixer. Additionally, an exhaust gas sensor may provide a more accurate exhaust gas sample reading to a controller for diagnosing engine components.

As an example, an exhaust system may comprise a static exhaust gas mixer, located along an exhaust passage, comprising upstream and downstream halves physically coupled to a ring, the upstream and downstream halves having upstream and downstream strips physically coupled to upstream and downstream flow guides and the ring at opposite ends, and where flow spaces are located between each strip of the upstream and downstream strips. The upstream and downstream halves may be rotationally misaligned about a central axis of the exhaust passage, where the upstream strips are directly upstream of downstream flow spaces of the downstream half and the downstream strips are directly downstream of upstream flow spaces of the upstream half. The mixer may be coupled to an exhaust pipe via a plurality of supports, and where opposite ends of the supports are physically coupled to the ring and interior surfaces of the exhaust pipe. In one example, the upstream strips, downstream strips, upstream flow guide, downstream flow guide, and ring are impervious to exhaust gas flow. The upstream and downstream flow guides are circular, and where the ring is spaced away from and located directly between the upstream and downstream flow guides. The mixer may be spherical and hollow. The ring is spaced away from an exhaust pipe, and where an outer flow space is annular and located between the ring and the exhaust pipe and an inner flow space is substantially equal to a volume of the mixer. The flow spaces fluidly couple the inner flow space to the exhaust passage.

In this way, a compact, easy to manufacture mixer may be located upstream of a variety of exhaust system components to increase an accuracy of a sensor reading or improve efficacy of exhaust after-treatment devices. By misaligning portions of the mixer, exhaust gas is forced to alter its original flow path to flow out of the mixer. This increases exhaust gas turbulence. Additionally, by making the mixer compact, the sturdiness of the mixer is increased and sounds emitted by the mixer are decreased. In this way, the mixer may be quieter that other mixers comprising longer components. The technical effect of placing an exhaust mixer in an exhaust pipe is to improve an exhaust gas mixture homogeneity such that components downstream of the mixer may increase functionality.

A first exhaust system comprising a static exhaust gas mixer, located along an exhaust passage, comprising upstream and downstream halves physically coupled to a ring, the upstream and downstream halves having upstream and downstream strips physically coupled to upstream and downstream flow guides and the ring at opposite ends, and where flow spaces are located between each strip of the upstream and downstream strips. A first example of the exhaust system further comprises where the upstream and downstream halves are rotationally misaligned about a central axis of the exhaust passage, and where the upstream strips are directly upstream of downstream flow spaces of the downstream half and the downstream strips are directly downstream of upstream flow spaces of the upstream half. A second example of the exhaust system, optionally including the first example, further includes where the mixer is coupled to an exhaust pipe via a plurality of supports, and where opposite ends of the supports are physically coupled to the ring and interior surfaces of the exhaust pipe. A third example of the exhaust system, optionally including the first and/or second examples, further includes where the upstream strips, downstream strips, upstream flow guide, downstream flow guide, and ring are impervious to exhaust gas flow. A fourth example of the exhaust system, optionally including one or more of the first through third examples, further includes where the upstream and downstream flow guides are circular, and where the ring is spaced away from and located directly between the upstream and downstream flow guides. A fifth example of the exhaust system, optionally including one or more of the first through fourth examples, further includes where the mixer is spherical and hollow. A sixth example of the exhaust system, optionally including one or more of the first through fifth examples, further includes where the ring is spaced away from an exhaust pipe, and where an outer flow space is annular and located between the ring and the exhaust pipe and an inner flow space is substantially equal to a volume of the mixer. A seventh examples of the exhaust system, optionally including one or more of the first through sixth examples, further includes where the flow spaces fluidly couple the inner flow space to the exhaust passage.

A second exhaust system comprising an exhaust passage comprising an exhaust gas mixer having a plurality of protrusions extending from a ring concentric with a central axis of the exhaust passage with adjacent protrusions extending in different directions, and where an outer flow space is located between the mixer and an exhaust pipe and an inner flow space traverses through the mixer along the central axis. A first example of the exhaust system further includes where the plurality of protrusions alternate with a first protrusion extending into the outer flow space, a second protrusion adjacent the first protrusion protrudes into the inner flow space. A second example of the exhaust system, optionally including the first example, further includes where the plurality of protrusions are angled relative to a direction of incoming exhaust gas flow. A third example of the exhaust system, optionally including the first and/or second examples, further includes where the plurality of protrusions are curved with outer portions having a C shape and inner portions being pointed. A fourth example of the exhaust system, optionally including one or more of the first through third examples, further includes where the outer portions extend into the outer flow space and the inner portions extend into the inner flow space. A fifth example of the exhaust system, optionally including one or more of the first through fourth examples, further includes where protrusions adjacent one another are angled and oriented oppositely one another.

A third exhaust system comprising an exhaust passage comprising an exhaust gas mixer, a ring spaced away from an exhaust pipe with an outer flow space located between the ring and the exhaust pipe and an inner flow space traversing an entire length of the ring along a central axis of the exhaust pipe, and a plurality of alternating upstream protrusions where adjacent upstream protrusions extend in opposite directions, a plurality of alternating downstream protrusions where adjacent downstream protrusions extend in opposite directions, and where the upstream and downstream protrusions are physically coupled to opposite edges of the ring. A first example of the exhaust system further includes where a downstream protrusion of the downstream protrusions extending into the inner flow space and an upstream protrusion of the upstream protrusions, located directly upstream of the downstream protrusion, extending into the outer flow space. A second example of the exhaust system, optionally including the first example, further includes where the upstream protrusions, downstream protrusions, and ring are impervious to exhaust gas. A third example of the exhaust system, optionally including the first and second examples, further includes where a cross-section of the mixer having a Z-shape. A fourth example of the exhaust system, optionally including one or more of the first through third examples, further includes where the mixer is symmetric and concentric with the exhaust pipe along the central axis. A fifth example of the exhaust system, optionally including one or more of the first through fourth examples, further includes where the mixer is a single machined piece fixed to the exhaust pipe via a plurality of supports.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system comprising:
   an exhaust gas mixer, located along an exhaust passage, comprising upstream and downstream halves physically coupled to a ring, the upstream and downstream halves having upstream and downstream strips physically coupled to upstream and downstream flow guides and the ring at opposite ends, wherein flow spaces are located between each strip of the upstream and downstream strips, and wherein the upstream and downstream halves are rotationally misaligned about a central axis of the exhaust passage such that the upstream strips are directly upstream of downstream flow spaces of the downstream half and the downstream strips are directly downstream of upstream flow spaces of the upstream half.

2. The exhaust system of claim 1, wherein the mixer is coupled to an exhaust pipe via a plurality of supports, and wherein opposite ends of the supports are physically coupled to the ring and interior surfaces of the exhaust pipe.

3. The exhaust system of claim 1, wherein the upstream strips, downstream strips, upstream flow guide, downstream flow guide, and ring are impervious to exhaust gas flow.

4. The exhaust system of claim 1, wherein the mixer is spherical and hollow, wherein the ring is spaced away from an exhaust pipe, and wherein an outer flow space is annular and located between the ring and the exhaust pipe and an inner flow space is equal to a volume of the mixer.

5. The exhaust system of claim 4, wherein the flow spaces fluidly couple the inner flow space to the exhaust passage.

6. The exhaust system of claim 1, wherein the mixer is static.

7. The exhaust system of claim 1, wherein the upstream and downstream flow guides are circular, and wherein the ring is spaced away from and located directly between the upstream and downstream flow guides.

8. An exhaust system comprising:
   an exhaust passage comprising an exhaust gas mixer having a plurality of protrusions with faces mounted directly to a circumferential surface of a ring concentric with a central axis of the exhaust passage such that the protrusions are arranged in a circular pattern,
   the protrusions extending upstream or downstream from the ring with adjacent protrusions extending in different directions, and
   wherein an outer flow space is located between the mixer and an exhaust pipe and an inner flow space traverses through the mixer along the central axis.

9. The exhaust system of claim 8, wherein the plurality of protrusions alternates with a first protrusion extending into the outer flow space, and a second protrusion adjacent the first protrusion protrudes into the inner flow space.

10. The exhaust system of claim 8, wherein the plurality of protrusions is angled relative to a direction of incoming exhaust gas flow.

11. The exhaust system of claim 8, wherein the plurality of protrusions is curved with outer portions having a C shape and inner portions being pointed.

12. The exhaust system of claim 11, wherein the outer portions extend into the outer flow space and the inner portions extend into the inner flow space.

13. The exhaust system of claim 8, wherein protrusions adjacent one another are angled and oriented oppositely one another.

14. An exhaust system comprising:
an exhaust passage comprising an exhaust gas mixer;
a ring spaced away from an exhaust pipe with an outer flow space located between the ring and the exhaust pipe and an inner flow space traversing an entire length of the ring along a central axis of the exhaust pipe; and
a plurality of alternating upstream protrusions and a plurality of alternating downstream protrusions, wherein faces of the pluralities of upstream and downstream protrusions are physically coupled directly to opposite edges of the ring such that the protrusions form a circular pattern, and wherein adjacent upstream and downstream protrusions alternate between extending into the inner and outer flow spaces.

15. The exhaust system of claim 14, further comprising a downstream protrusion of the plurality of downstream protrusions extending into the inner flow space and an upstream protrusion of the plurality of upstream protrusions, located directly upstream of the downstream protrusion, extending into the outer flow space.

16. The exhaust system of claim 14, wherein the plurality of upstream protrusions, the plurality of downstream protrusions, and the ring are impervious to exhaust gas.

17. The exhaust system of claim 14, further comprising a cross-section of the mixer having a Z-shape.

18. The exhaust system of claim 14, wherein the mixer is symmetric and concentric with the exhaust pipe along the central axis.

19. The exhaust system of claim 14, wherein the mixer is a single machined piece fixed to the exhaust pipe via a plurality of supports.

* * * * *